United States Patent

[11] 3,600,617

[72] Inventor Theodore Frayer
North Canton, Ohio
[21] Appl. No. 4,552
[22] Filed Jan. 21, 1970
[45] Patented Aug. 17, 1971
[73] Assignee The Goodyear Tire & Rubber Company
Akron, Ohio

[54] PULSE GENERATOR
5 Claims, 2 Drawing Figs.
[52] U.S. Cl. .................................................... 310/156,
310/164
[51] Int. Cl. .................................................. H02k 21/16
[50] Field of Search .......................................... 310/67,
40.1, 156, 162, 164, 263, 66

[56] References Cited
UNITED STATES PATENTS
1,333,119 3/1920 Krag-Muller ................. 310/156 X
2,882,427 4/1959 Hils et al. .................... 310/67
2,985,778 5/1961 Fritz ........................... 310/41
3,403,273 9/1968 Higuchi ....................... 310/41

Primary Examiner—D. X. Sliney
Attorneys—F. W. Brunner, P. E. Milliken and Oldham & Oldham ABSTRACT: An electrical pulse generator comprising a fixed coil with an odd number of sets of pole piece fingers thereon is provided in association with a rotatable magnet having a different odd number of sets of pole piece fingers thereon and extending therefrom for operative association with and rotation by the pole piece fingers extending from the coil for creating pulses therein as a wheel in which the magnet is usually positioned is rotated.

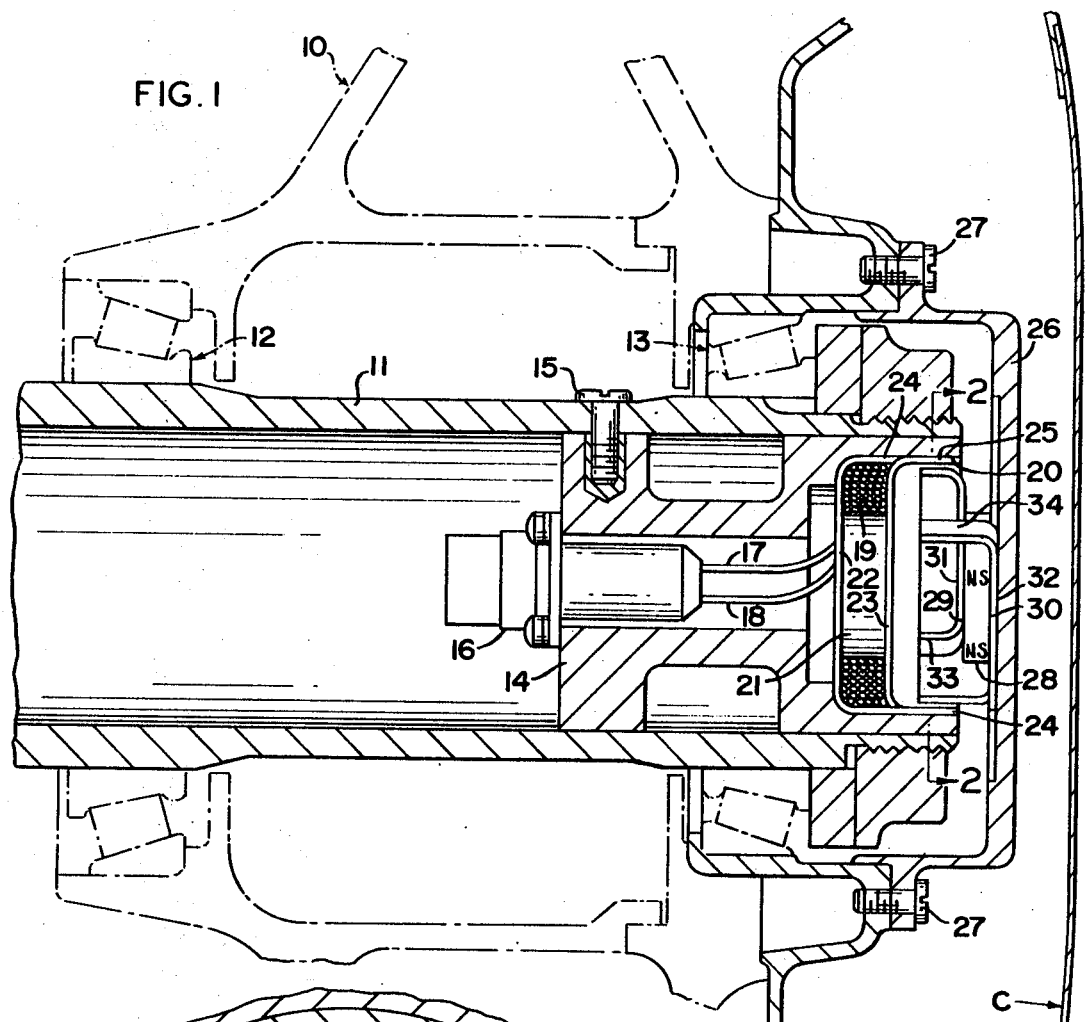

PULSE GENERATOR

This invention relates to a pulse generator, or transducer particularly adapted to be associated with a vehicle wheel brake antiskid system and wherein the pulse generator will provide a large number of pulses per rotation of the wheel to be controlled to measure the speed thereof.

PRIOR ART

Heretofore there have been various types of pulse generators such as transducers provided and they have been designed for various uses. In the control of skidding in vehicle wheels, and particularly in aircraft, it is very desirable that a very rapid speed indication signal be provided to show when a skid situation is developing. To achieve the proper type of control, it is highly desirable that a large number of pulses be provided per wheel rotation and that these pulses be fed to proper control circuitry to effect the desired control action. The prior art has used various methods and apparatus to indicate by a frequency measurement the speed of rotation of the wheel. For example, U.S. Pat. No. 3,017,145 teaches utilization of an electrical generator adapted for sensing wheel rotation which utilizes permanent magnets and a pole relationship to obtain frequency. U.S. Pat. No. 3,233,946 teaches utilization of a proximity coil with pole pieces to measure wheel rotation. While these prior systems have functioned relatively effectively in many instances, it is desirable to provide an improved, relatively inexpensive pulse generator for use particularly in antiskid control apparatus and to provide a sturdy, mechanically sound, compact apparatus for pulse generation that can be used to indicate changes in wheel speeds.

It is the general object of the present invention to provide an improved pulse generator which is relatively inexpensive, compact, and that provides a long service life with minimum maintenance.

Another object of the invention is to generate a large number of pulses with relatively few pole pieces.

Another object of the invention is to provide a relatively small fixed coil with a pair of pole pieces having a plurality of axially extending pole piece fingers thereon and to provide a rotatable permanent magnet assembly having a pair of pole pieces having a plurality of axially extending pole piece fingers thereon positioned for rotating in the plane of the pole piece fingers of the fixed coil to provide a variable magnetic coupling therebetween with rotation of the rotatable magnet assembly.

A further object of the invention is to utilize an odd number of pole teeth on a pair of pole pieces in a transducer in a fixed coil portion thereof and a different but odd number of teeth on a pair of pole pieces on a rotatable magnet assembly provided in operative association with the fixed pole teeth to provide an electrical voltage pulse for each angular motion equal to the differential circumferential spacing between the pole teeth on the different pole pieces in the transducer.

For a better understanding of the invention, reference should be had to the accompanying drawings, wherein:

FIG. 1 is a vertical cross section of an axle and wheel combination including the pulse generator of the invention; and FIG. 2 is a diagrammatic vertical section, taken on line 2-2 of FIG. 1, to indicate the relative circumferential positioning and spacing of the poles in the pulse generator of FIG. 1.

When referring to corresponding members shown in the drawing and referred to in the specification, corresponding numerals are used to facilitate comparison therebetween.

SUMMARY OF THE INVENTION

To achieve the present invention, a pulse generator is provided comprising a housing with a fixed coil positioned therein, and with a pair of pole pieces individually abutted against different sides of the coil with the pole pieces each having the same but an odd number of axially extending fingers thereon at the periphery of the coil and extending therefrom in the same direction. These fingers are alternately positioned in uniformly circumferentially spaced relation to each other. A rotatable member is operatively aligned with the axis of the housing, and a permanent magnet, with a pair of flat faces of opposite polarity, is carried by the rotatable member. A flat pole piece is positioned against each face of the permanent magnet and has an odd number of pole piece fingers extending therefrom towards said housing and with the fingers of the magnet pole pieces being alternately positioned in uniformly circumferentially spaced relationship to each other. Such magnet pole piece fingers are positioned radially within the pole piece fingers of the coil pole pieces whereby on rotation of the rotatable member, a large number of electrical pulses are obtained in the coil per revolution, which pulses can be used for measuring the rotational speed of such rotatable member.

In general, the pulse generator of the present invention particularly is useful in antiskid braking systems wherein it is necessary to sense, accurately and instantaneously, the present rotational speed of a wheel to sense properly when it is approaching skid conditions so that suitable antiskid circuitry can be actuated to control braking action and avoid skidding conditions.

In the accompanying drawings, a wheel 10 is indicated that is journaled on an axle 11 by bearings 12 and 13, or equivalent means.

The pulse generator, or transducer of the invention, is adapted to be carried operatively by the axle 11, and thus a suitable housing 14, usually tubular, and which is made from nonmagnetic material, is secured within the axle 11 usually at an end thereof by a suitable member such as a cap screw 15. This housing 14 has a conventional connector member or socket 16 secured thereto with a pair of leads 17 and 18 extending therefrom and connecting to a coil 19 received within a counterbored section 20 of the housing 14. Normally, the core opening of this coil 19 has a soft iron core or magnetic member 21 positioned therein to provide a low reluctance path for the flow of electromagnetic flux therethrough.

A pair of spiderlike, good flux conducting pole pieces 22 and 23 are individually abutted against the opposed side faces of the coil 19 and the ends of the member 21, as indicated in the drawings, and these pole pieces 22 and 23 have a plurality of odd in number sets of pole piece fingers or sections 24 and 25 extending axially therefrom at the periphery of the coil 19. It will be seen that the fingers 24 hence are axially longer than the fingers 25 but with all of such fingers 24 and 25 being positioned at a uniform radial distance with relation to the centerline of the housing 14 and protruding axially beyond the plane defined by the coil 19. This coil 19 and pole pieces 22 and 23 can be secured in position in the housing 14 in a conventional manner, as by potting such members in the counterbore 20 by conventional resins or equivalent materials.

In order to provide induced electrical impulses in the coil 19, a permanent magnet means is provided in operative association with the wheel 10 for rotation with relationship to the coil 19 and the pole pieces and pole piece fingers provided thereon. Hence, any conventional type of a wheel cover C is provided that has a center member or section 26 thereon and which center member 26 is secured to the wheel 10 for rotation therewith as by cap screws 27 engaging a flange portion of the member 26. A suitable permanent magnet 28 is provided and it is made of disc shape with opposed north and south poles provided on the opposite faces thereof as indicated in the drawings. The magnet 28 is relatively thin axially but yet provides an effective electromagnetic field for use in inducing electrical impulses in the coil 19, as later described. This permanent magnet 28, having flat faces 29 and 30 thereon, has any known magnetizable material therein, and the magnet can be made of any available diameter such as will fit readily into the counterbored end 20 of the housing 14.

Similar to the pole pieces 22 and 23, a pair of magnetic pole pieces 31 and 32 are provided and are suitably operably secured adjacent and abutting against the end faces 29 and 30 of the magnet 28. These pole pieces are similar to those described hereinbefore and are of spiderlike nature. An odd number of axially extending sets of substantially flat fingers or sections 33 and 34 are provided on each of these pole pieces 31 and 32, respectively. The fingers 34 on the pole piece 32 are axially longer than the similar fingers 33 provided on the pole piece 31, but with both of such sets of pole piece fingers extending axially a short distance beyond the adjacent face 29 of the permanent magnet 28. The pole piece fingers 33 and 34 are uniformly spaced and are alternately positioned circumferentially, but being at a common radius with relation to the center axis of the axle 11 so as to be received within the pole piece fingers 24 and 25 so as to rotate immediately adjacent to the fixed coil fingers.

FIG. 2 of the drawings shows the pole piece fingers 24 and 25 in relation to the pole piece fingers 33 and 34 when seven teeth or fingers are provided on each of the pole pieces 22 and 23 and when three teeth or fingers are provided on each of the pole pieces 31 and 32. With particular configuration, a pulse will be obtained on each arcuate movement of the wheel 10 corresponding to the differential between the circumferential spacing of the pole piece fingers 24 and 25 with relation to the circumferential spacing of the pole piece fingers 33 and 34. Specifically, if seven teeth are provided on each of the pole pieces 22 and 23 and with three teeth on each of the pole pieces 31 and 32, then the spacing will be as shown in FIG. 2 and a pulse will be obtained in the coil 19 with each alignment of the rotating and stationary fingers, thus making a pulse for every one forty-second of a wheel rotation. Alternate pulses will have opposite polarity.

It will be realized that these electrical impulses are provided in the coil 19 by operation of Lenz's Law, wherein the reluctance of the coil 19 in association with its pole pieces 22 and 23 changes each time one of the pole piece fingers 33 or 34 passes by one of the fingers 24 or 25 on the pole pieces 22 and 23 whereby an induced current is produced either of a plus or a minus direction depending upon the relative polarities of the pole piece fingers being moved immediately adjacent and past each other.

Obviously the pulses generated in the transducer or pulse generator of the invention can be readily transmitted from the connector 16 to any type of a control circuit and with such pulses then being measured and being compared as to frequencies required to set up skid conditions in relation to the then permitted amount of braking action in the system whereby the transducer or pulse generator can be used readily in antiskid control systems.

The pulse generator of the invention is quite compact, and can fit into relatively small diameter axles 11 and with the permanent magnet 28 having a very short axial length so that a compact, but sturdy system can be provided that will effectively indicate wheel speed substantially instantaneously.

While any suitable number of pole piece fingers can be provided in the two pairs of pole pieces 22 and 23, and 31 and 32 provided in association with the coil 19 and magnet 28, respectively, it is necessary that the number of pairs of sets of fingers in each pair of pole pieces be odd in number and with the number of sets of north and south fingers on the magnet pole pieces being different in odd number from the odd number of sets of corresponding fingers on the coil pole pieces. Usually a minimum of three pole piece fingers on the permanent magnet assembly would be satisfactory in association with seven pole piece fingers on each of the pole pieces of the fixed coil, but preferably even a larger number of pole piece fingers are desired so that seven pole piece fingers on each pole piece of the coil and five fingers on each pole piece 31 and 32 of the permanent magnet, at least, are desired, but with higher units of such pole piece fingers being useful in some instances. Such constructions provide the required high quantity of pulses per revolution.

The housing 14 and cover 26 preferably are made from nonmagnetic material.

In view of the foregoing, it is believed that a novel and improved transducer has been provided and that the objects of the invention have been achieved.

What I claim is:
1. A pulse generator comprising
a housing having a longitudinal axis,
a fixed coil positioned in said housing,
a magnetic core in the bore of said coil,
a pair of flat pole pieces one of which is adjacent each side of said coil and an end of said core, said pole pieces each having a plurality of axially extending fingers thereon at the periphery of said coil extending in the same direction and being alternately positioned in uniformly circumferentially space relation, each adjacent pair of such fingers forming a set and an odd number of sets of such fingers being provided,
a rotatable member operatively aligned with the axis of said housing,
a permanent magnet having a pair of flat faces of opposite polarity carried by said rotatable member, and
a flat pole piece positioned against each face of said permanent magnet and each side of said coil, both of said second-named pole pieces having a plurality of axially extending fingers thereon, the fingers of the pair of magnet pole pieces being alternately positioned in uniformly circumferentially spaced relation, each adjacent pair of such fingers forming a set and an odd number of sets of such fingers being provided, a different number of sets of said fingers on the coil pole pieces being provided than on the magnet pole pieces, said fingers on the two different pairs of coil and magnet pole pieces being immediately radially adjacent whereby on rotation of said member a large number of electrical pulses are obtained in said coil per revolution.

2. A pulse generator as in claim 1 where a permanent magnet is used and said housing and member are made from nonmagnetic material.

3. A pulse generator comprising
a fixed housing,
a fixed coil positioned in said housing,
a soft iron core in the bore of said coil,
a pair of flat pole pieces one of which abuts on each side of said coil and an end of said core, said pole pieces each having an odd number of axially extending fingers thereon at the periphery of said coil extending in the same direction and being alternately positioned in uniformly circumferentially spaced relation,
a rotatable member operatively aligned with the axis of said housing,
a permanent magnet having a pair of flat faces of opposite polarity carried by said rotatable member, and
a flat pole piece secured to each face of said permanent magnet, each of said last-named pole pieces having an odd number of axially extending fingers thereon at the periphery of said magnet extending in the same direction and being alternately positioned in uniformly circumferentially spaced relation, said second-named pole pieces having a different number of said fingers thereon than said first-named pole pieces, said second-named pole pieces being positioned immediately radially adjacent said first-named pole pieces whereby on rotation of said member a large number of electrical pulses are obtained in said coil per revolution.

4. A pulse generator as in claim 3 where at least seven fingers are provided on said first-named pole pieces, and at least five fingers are formed on said second-named pole pieces.

5. In combination with a wheel rotatably mounted on an axle, a transducer comprising
a housing secured to said axle,
a coil positioned in said housing,
a magnetic core in the bore of said coil,
a pair of flat pole pieces one of which is adjacent each side of said coil and has a section adjacent an end of said core, said pole pieces each having an odd number of axially extending fingers thereon at the periphery of said coil extending in the same direction and being alternately positioned in uniformly circumferentially spaced relation, a member operatively secured to said wheel and operatively aligned with the axis of said housing, a permanent magnet having a pair of flat faces of opposite polarity carried by said rotatable member, a flat pole piece positioned over each face of said permanent magnet, each of said last-named pole pieces having an odd number of axially extending fingers thereon at the periphery of said magnet extending in the same direction and being alternately positioned in uniformly circumferentially spaced relation, a lesser number of fingers being provided on said second-named pole pieces than on said first-named pole pieces, said second-named pole pieces being positioned immediately radially adjacent said first-named pole pieces whereby on rotation of said wheel a large number of electrical pulses are obtained in said coil per revolution, and leads connecting to said coil to transmit electrical signals therefrom to a remote point to measure wheel rotational speed.